United States Patent
Miyazaki et al.

(10) Patent No.: US 11,186,171 B2
(45) Date of Patent: Nov. 30, 2021

(54) OPERATION MECHANISM OF WORK VEHICLE AND WORK VEHICLE

(71) Applicant: KUBOTA CORPORATION, Osaka (JP)

(72) Inventors: Daisuke Miyazaki, Sakai (JP); Koji Masumoto, Sakai (JP); Kenzo Ushiro, Sakai (JP); Hideaki Ezaki, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/832,065

(22) Filed: Mar. 27, 2020

(65) Prior Publication Data

US 2020/0307375 A1    Oct. 1, 2020

(30) Foreign Application Priority Data

Apr. 1, 2019    (JP) .............................. JP2019-069745

(51) Int. Cl.
| B60K 20/02 | (2006.01) |
| B60K 20/04 | (2006.01) |
| B62D 49/06 | (2006.01) |

(52) U.S. Cl.
CPC .......... B60K 20/04 (2013.01); B62D 49/0692 (2013.01)

(58) Field of Classification Search
CPC .......... B60K 20/02; B60K 20/04; B62D 1/12; B62D 49/0692; F16H 59/02; F16H 59/0278
See application file for complete search history.

(56) References Cited

U.S. PATENT DOCUMENTS

| 5,233,880 | A | 8/1993 | Sato et al. |
| 5,263,385 | A * | 11/1993 | Hirata ..................... F16H 61/66 74/481 |
| 6,279,937 | B1 * | 8/2001 | Hunt ....................... F16H 59/06 180/333 |
| 7,954,592 | B2 * | 6/2011 | Miyazaki .............. E02F 9/2203 180/321 |
| 10,625,795 | B2 * | 4/2020 | Yoshida ................. B60K 17/28 |
| 2006/0054377 | A1 | 3/2006 | Izukura et al. |
| 2006/0081084 | A1 | 4/2006 | Nishino et al. |
| 2009/0005219 | A1 | 1/2009 | Miyazaki et al. |
| 2013/0213178 | A1 | 8/2013 | Masumoto et al. |

FOREIGN PATENT DOCUMENTS

JP    2013107600 A    6/2013

OTHER PUBLICATIONS

The extended European Search Report dated Jun. 25, 2020, by the European Patent Office in corresponding European Application No. 20165759.0. (7 pages).

* cited by examiner

*Primary Examiner* — Adam D Rogers
(74) *Attorney, Agent, or Firm* — Buchanan Ingersoll & Rooney PC

(57) ABSTRACT

Provided is an operation mechanism of a work vehicle capable of suppressing transmission of vibration from a vehicle body to a cabin. The operation mechanism of a work vehicle includes: a first link portion which is supported by the vehicle body (a center frame, a transmission, and the like); a second link portion which is supported by a cabin placed on the vehicle body; and a third link portion which has flexibility and connects the first link portion and the second link portion so as to be interlockable.

14 Claims, 7 Drawing Sheets

OPERATION MECHANISM OF WORK VEHICLE AND WORK VEHICLE

TECHNICAL FIELD

The disclosure relates to a technique of an operation mechanism of a work vehicle.

BACKGROUND ART

Conventionally, a technique related to an operation mechanism of a work vehicle is known. For example, the technique is described in JP 2013-107600 A.

JP 2013-107600 A describes a plurality of operation levers provided in a cabin. The operation lever is rotatably supported with respect to a support frame forming the cabin. A grip operation part for an operator to grip is formed at the upper end portion of the operation lever. The lower end of the operation lever is linked to various devices via a connection link.

For example, one of the operation levers is operatively linked to a transmission via the connection link. The operation lever is used as a cruise operation lever that can be switched between a cruise state in which the work vehicle runs at a constant speed and a state in which the cruise state is released.

Here, as described above, when the operation lever provided in the cabin is linked to the vehicle body (transmission) via the connection link, a vibration from the vehicle body may be transmitted into the cabin through the connection link. In this case, noise may be generated based on the vibration transmitted into the cabin. Therefore, a technique capable of suppressing the vibration transmitted from the vehicle body into the cabin is desired.

SUMMARY OF INVENTION

The disclosure has been made in view of the above circumstances, and a problem to be solved is to provide an operation mechanism of a work vehicle and a work vehicle capable of suppressing transmission of a vibration from a vehicle body to a cabin.

The problem to be solved by the disclosure is as described above. Next, a unit for solving the problem will be described.

That is, an operation mechanism of a work vehicle of the disclosure includes: a first link portion which is supported by the vehicle body; a second link portion which is supported by a cabin placed on the vehicle body; and a third link portion which has flexibility and connects the first link portion and the second link portion so as to be interlockable.

Further, in the operation mechanism of a work vehicle according to the disclosure, the first link portion is connected to a transmission such that a shift stage of the transmission is changeable.

Further, in the operation mechanism of a work vehicle according to the disclosure, the second link portion is connected to an operation tool capable of changing the shift stage of the transmission.

Further, in the operation mechanism of a work vehicle according to the disclosure, the operation tool is provided in a console disposed on right and left sides of a seat.

Further, in the operation mechanism of a work vehicle according to the disclosure, the operation tool is a cruise lever capable of keeping the shift stage of the transmission constant.

Further, in the operation mechanism of a work vehicle according to the disclosure, the second link portion includes a first rotation member which is rotatably supported with respect to a bottom surface of the cabin, a second rotation member which is disposed to be at least partially positioned inside the cabin and is rotatably supported by the cabin, and a connection member which connects the first rotation member and the second rotation member.

Further, in the operation mechanism of a work vehicle according to the disclosure, the connection member includes a first connection portion which is connected to the first rotation member, a second connection portion which is connected to the second rotation member, and a third connection portion which is disposed between the first connection portion and the second connection portion in a vertical direction and to which the third link portion is connected.

Further, in the operation mechanism of a work vehicle according to the disclosure, the third connection portion is disposed to be displaced with respect to the first connection portion in a right-left direction.

Further, a work vehicle according to the disclosure includes the operation mechanism.

The disclosure has the following effects.

In the operation mechanism of a work vehicle according to the disclosure, the transmission of the vibration from the vehicle body to the cabin can be suppressed. Thereby, the noise in the cabin can be reduced.

In the operation mechanism of a work vehicle according to the disclosure, transmission of the vibration from the transmission can be suppressed.

In the operation mechanism of a work vehicle according to the disclosure, the transmission of the vibration from the transmission to the operation tool can be suppressed. Accordingly, the noise in the cabin through the operation tool can be reduced.

In the operation mechanism of a work vehicle according to the disclosure, the transmission of the vibration from the operation tool to the console can be suppressed. Accordingly, the noise in the cabin through the console can be reduced.

In the operation mechanism of a work vehicle according to the disclosure, the noise in the cabin through the cruise lever can be reduced.

In the operation mechanism of the work vehicle according to the disclosure, the second link portion can be stably supported by supporting two members of the first rotation member and the second rotation member on the cabin.

In the operation mechanism of a work vehicle according to the disclosure, a gap between the third connection portion and the second connection portion can be reduced, and the stress applied to the connection member can be reduced.

In the operation mechanism of the work vehicle according to the disclosure, the load applied to the connection member can be dispersed.

In the work vehicle of the disclosure, the transmission of the vibration from the vehicle body to the cabin can be suppressed. Thereby, the noise in the cabin can be reduced.

DESCRIPTION OF EMBODIMENT

Figure 1:
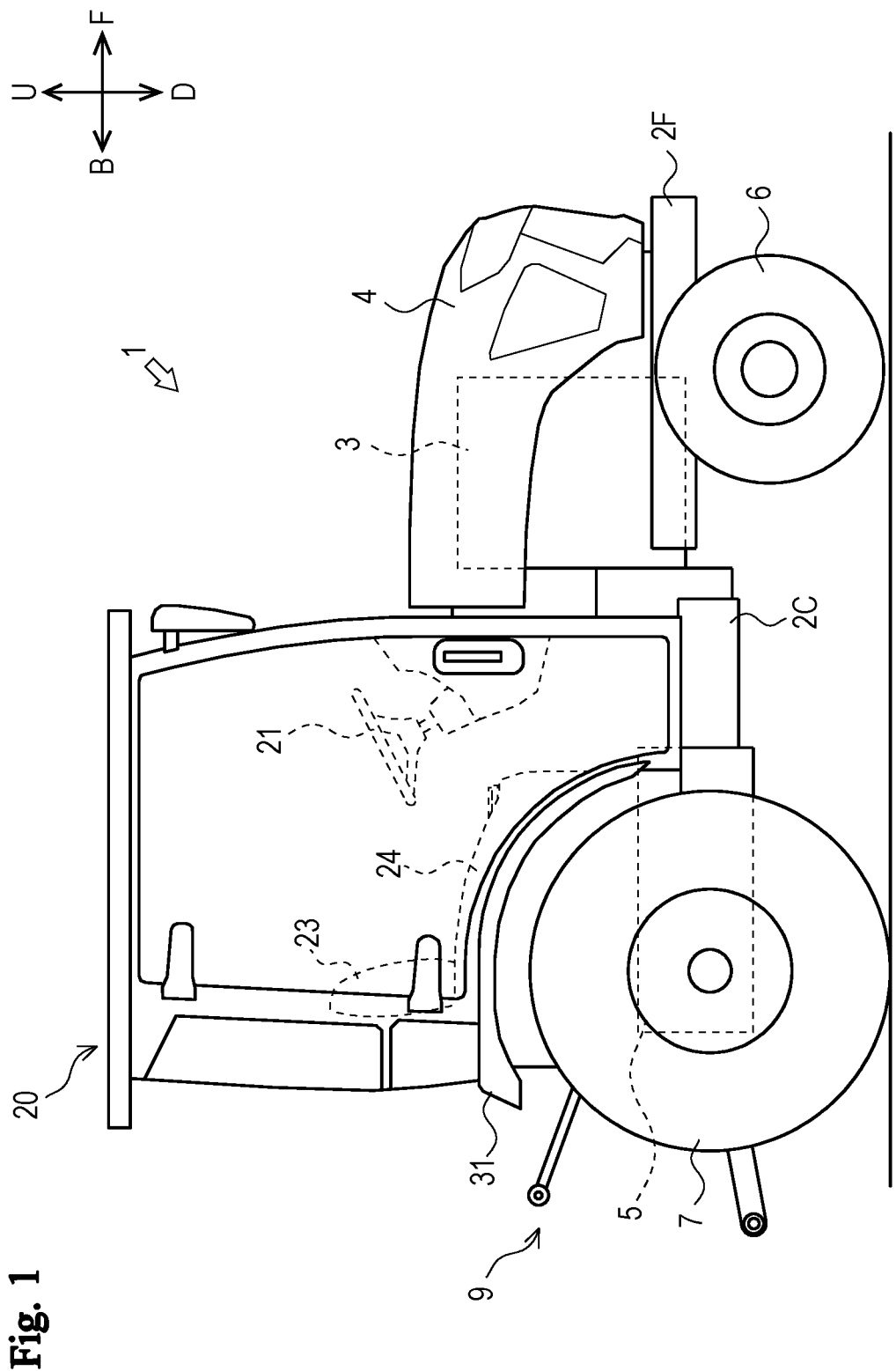
FIG. 1 is a side view illustrating an overall configuration of a tractor according to one embodiment of the disclosure.
Figure 2:
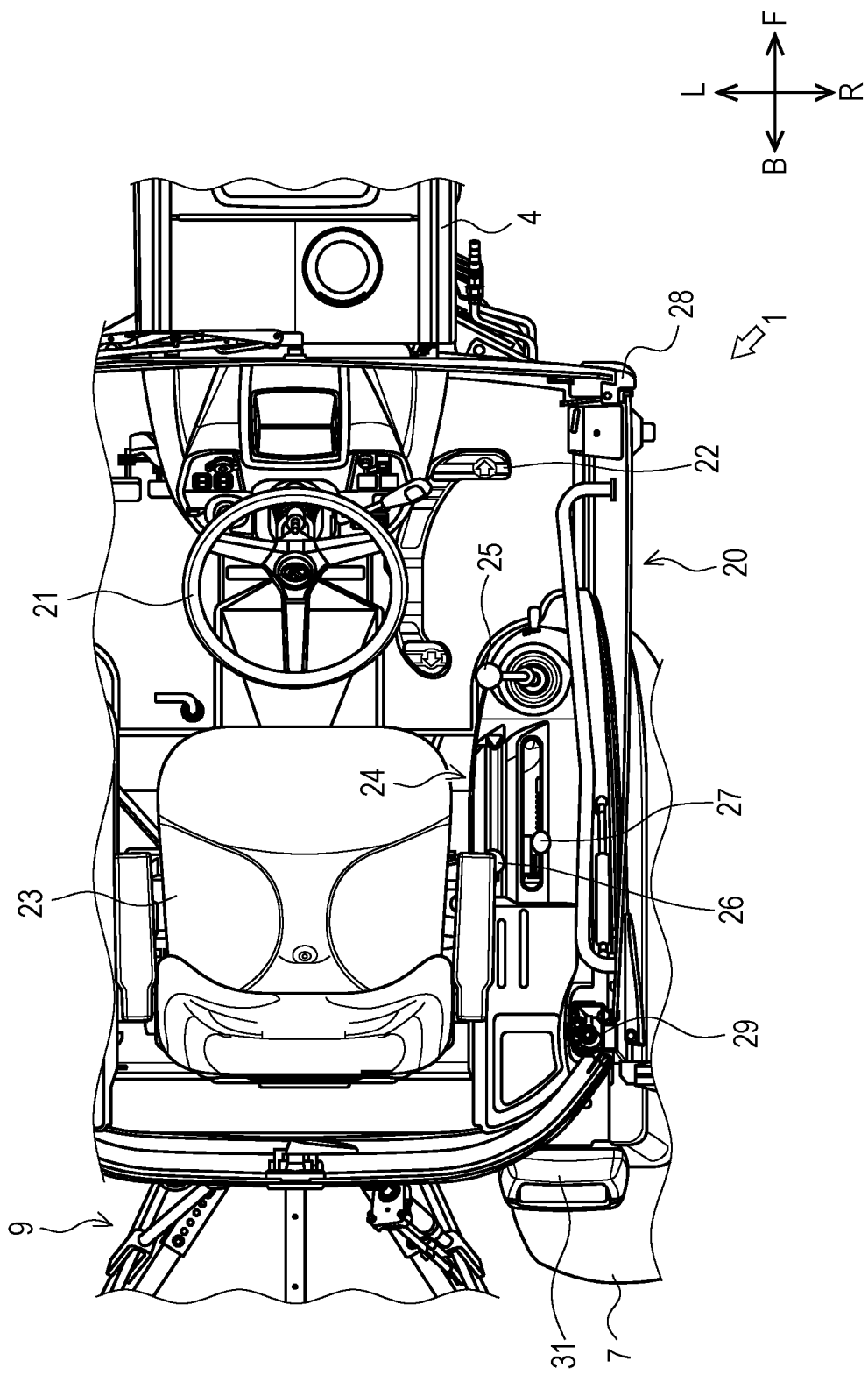
FIG. 2 is a plan view illustrating an inside of a cabin.
Figure 3:
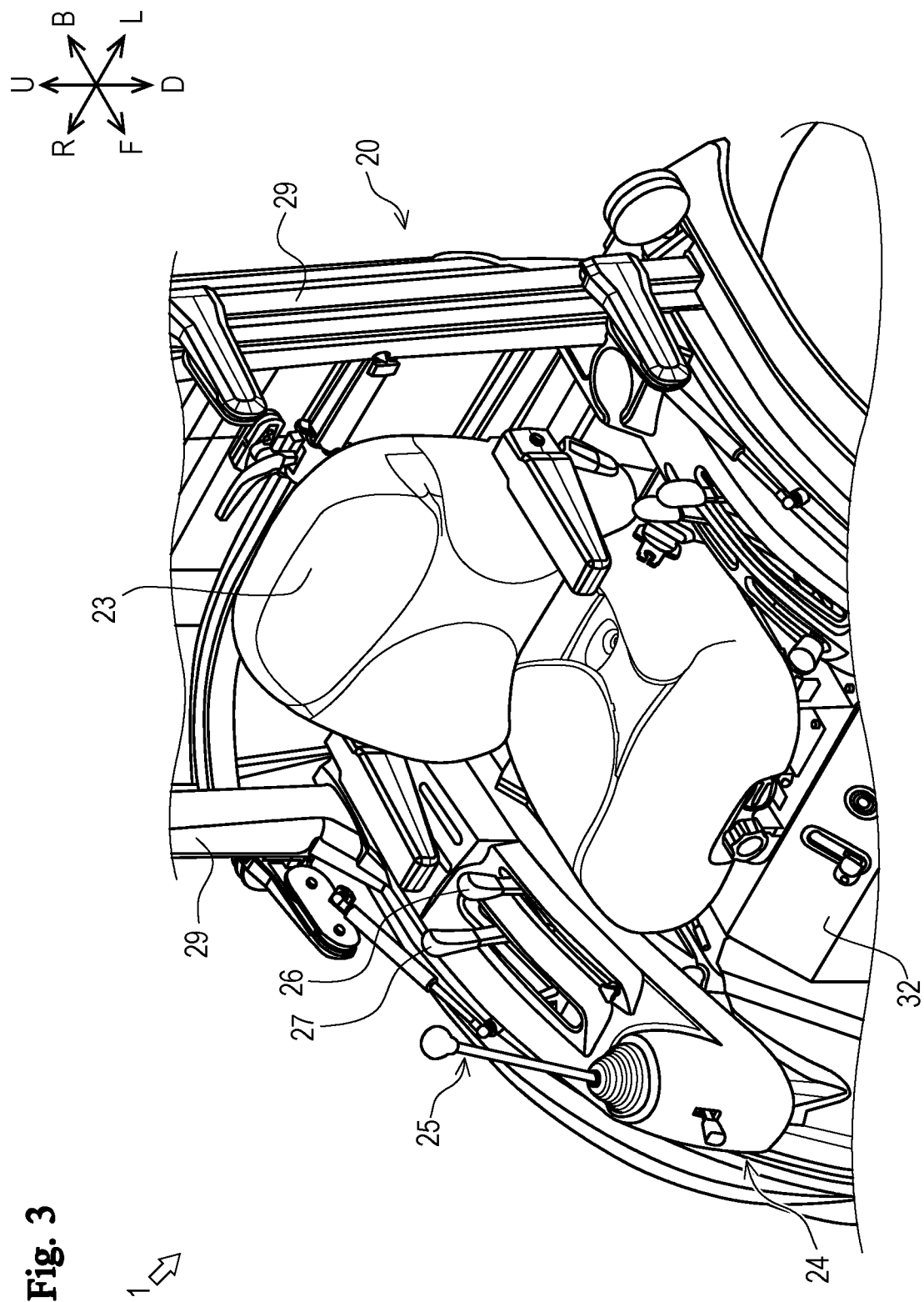
FIG. 3 is a perspective view of the same.

In the following, a description is given with the directions indicated by arrows U, D, F, B, L and R in the drawing defined as upward, downward, forward, backward, leftward and rightward, respectively.

First, an overall configuration of a tractor 1 according to an embodiment of the disclosure will be described with reference to FIGS. 1 to 4.

The tractor 1 illustrated in FIGS. 1 to 4 mainly includes a front frame 2F, a center frame 2C, an engine 3, a hood 4, a transmission 5, a front wheel 6, a rear wheel 7, a lifting device 9, a cabin 20, an operation mechanism 40, and the like.

The front frame 2F and the center frame 2C are frame-shaped members formed by appropriately combining a plurality of panel members. The front frame 2F and the center frame 2C are disposed with the longitudinal directions directed in a front-rear direction. The engine 3 is fixed to the rear portion of the front frame 2F. The engine 3 is covered by the hood 4. The center frame 2C is fixed to the rear portion of the engine 3. The transmission 5 housed in a transmission case is provided behind the center frame 2C. As the transmission 5 in this embodiment, it is assumed that the transmission 5 has a hydro-static transmission (HST) or the like and is capable of continuously shifting.

The front portion of the front frame 2F is supported by a pair of right and left front wheels 6 via a front axle mechanism (not illustrated). The rear portion of the transmission 5 is supported by a pair of right and left rear wheels 7 via a rear axle mechanism (not illustrated).

The lifting device 9 is provided at the rear portion of the transmission 5. The lifting device 9 can be mounted with various work devices (for example, a cultivator). The lifting device 9 can raise and lower the mounted work device by an actuator such as a hydraulic cylinder. The power of the engine 3 can be transmitted to the lifting device 9 through a PTO shaft (not illustrated).

After the power of the engine 3 is shifted by the transmission 5, the power can be transmitted to the front wheels 6 through the front axle mechanism and can be transmitted to the rear wheels 7 through the rear axle mechanism. The front wheels 6 and the rear wheels 7 are driven to rotate by the power of the engine 3, so that the tractor 1 can run. Further, the work device mounted on the lifting device 9 can be driven by the power of the engine 3.

The cabin 20 is disposed above the center frame 2C and the transmission 5. At the front portion of the cabin 20, a steering wheel 21 for adjusting the turning angle of the front wheels 6, a speed change pedal 22 capable of changing a speed ratio by the transmission, and various other pedals are disposed. At substantially the center of the cabin 20, a seat 23 for a driver to sit down is disposed. A console 24 is disposed on the right side of the seat 23. Various operation tools are appropriately disposed on the console 24.

Specifically, a loader lever 25 for operating a front loader mounted on the tractor 1 is provided at a front end portion of the console 24. Behind the loader lever 25, a position lever 26 for raising and lowering the work device mounted on the lifting device 9 and a cruise lever 27 for operating the tractor 1 at a constant speed are provided. The position lever 26 and the cruise lever 27 are disposed side by side on the left and right sides respectively, and are provided so as to be rockable in the front-rear direction. The cruise lever 27 is formed so as to be held at any operation position.

Figure 4:
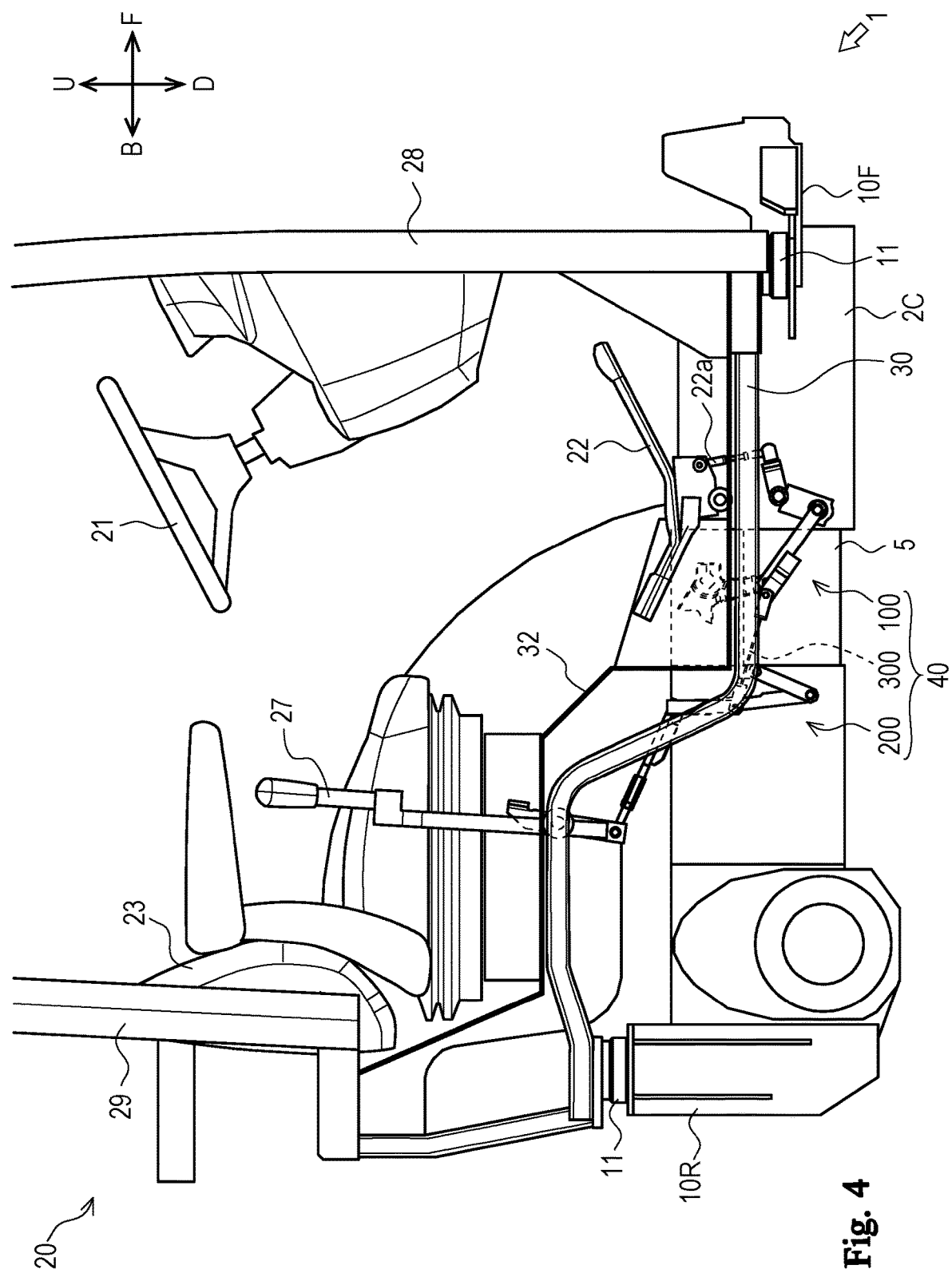
FIG. 4 is a schematic side view illustrating a disposition of an operation mechanism.

In addition, as illustrated in FIG. 4, the cabin 20 includes a frame body including a front pillar 28, a rear pillar 29, a side frame 30, and the like. A pair of the front pillars 28 is disposed on the right and left sides at the front portion of the cabin 20. A pair of the rear pillars 29 is disposed on the right and left sides at the rear portion of the cabin 20. The side frame 30 is disposed to extend forward and rearward so as to connect the lower end of the front pillar 28 and the lower end of the rear pillar 29. The side frame 30 is appropriately bent so as to bypass the axle of the rear wheel 7.

A fender 31 (see FIG. 2 and the like) that covers the rear wheel 7 from above is fixed to the side frame 30. Further, a plate-like bottom frame 32 forming the bottom portion of the cabin 20 is provided so as to extend over the right and left side frames 30. The bottom frame 32 is bent so that the rear portion is raised, and the seat 23 is placed on the rear portion. In addition, the cabin 20 is appropriately provided with a window, an opening/closing door, and the like.

The cabin 20 configured as above is placed on a pair of right and left front support frames 10F provided at the rear portion of the engine 3 and a pair of right and left rear support frames 10R provided at the rear portion of the transmission 5. The cabin 20 is placed on the front support frame 10F and the rear support frame 10R via a cushioning material 11 such as rubber, and is connected to the front support frame 10F and the like by bolts.

In this manner, the cabin 20 is formed separately from the engine 3, the center frame 2C, the transmission 5, the front support frame 10F, the rear support frame 10R, and the like, which are fixed to each other. When the separate cabin 20 is placed on the center frame 2C, the transmission 5 and the like via the cushioning material 11, the transmission of the vibration from the transmission 5 and the like to the cabin 20 is suppressed. Hereinafter, in the tractor 1, a main structural body (parts other than the cabin 20) including the transmission 5, the front frame 2F, the center frame 2C, and the like on which the cabin 20 is placed is collectively referred to as a "vehicle body".

The operation mechanism 40 changes the shift stage of the transmission 5 based on the operation of the speed change pedal 22 and the cruise lever 27. The operation mechanism 40 is disposed on the right side of the transmission 5 across the vehicle body and the cabin 20. Hereinafter, the operation mechanism 40 will be specifically described.

Figure 5:
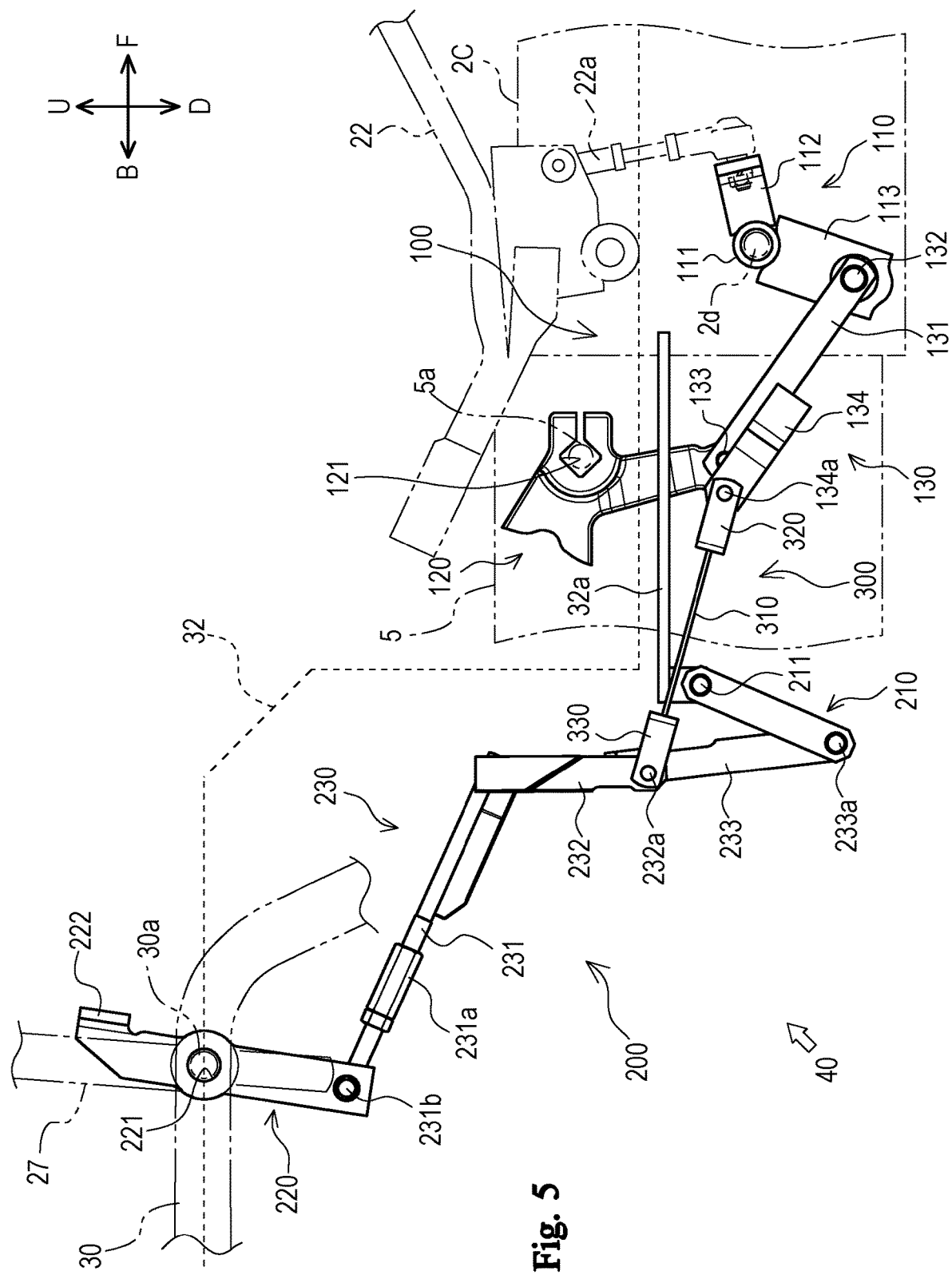
FIG. 5 is a side view illustrating the operation mechanism.
Figure 6:
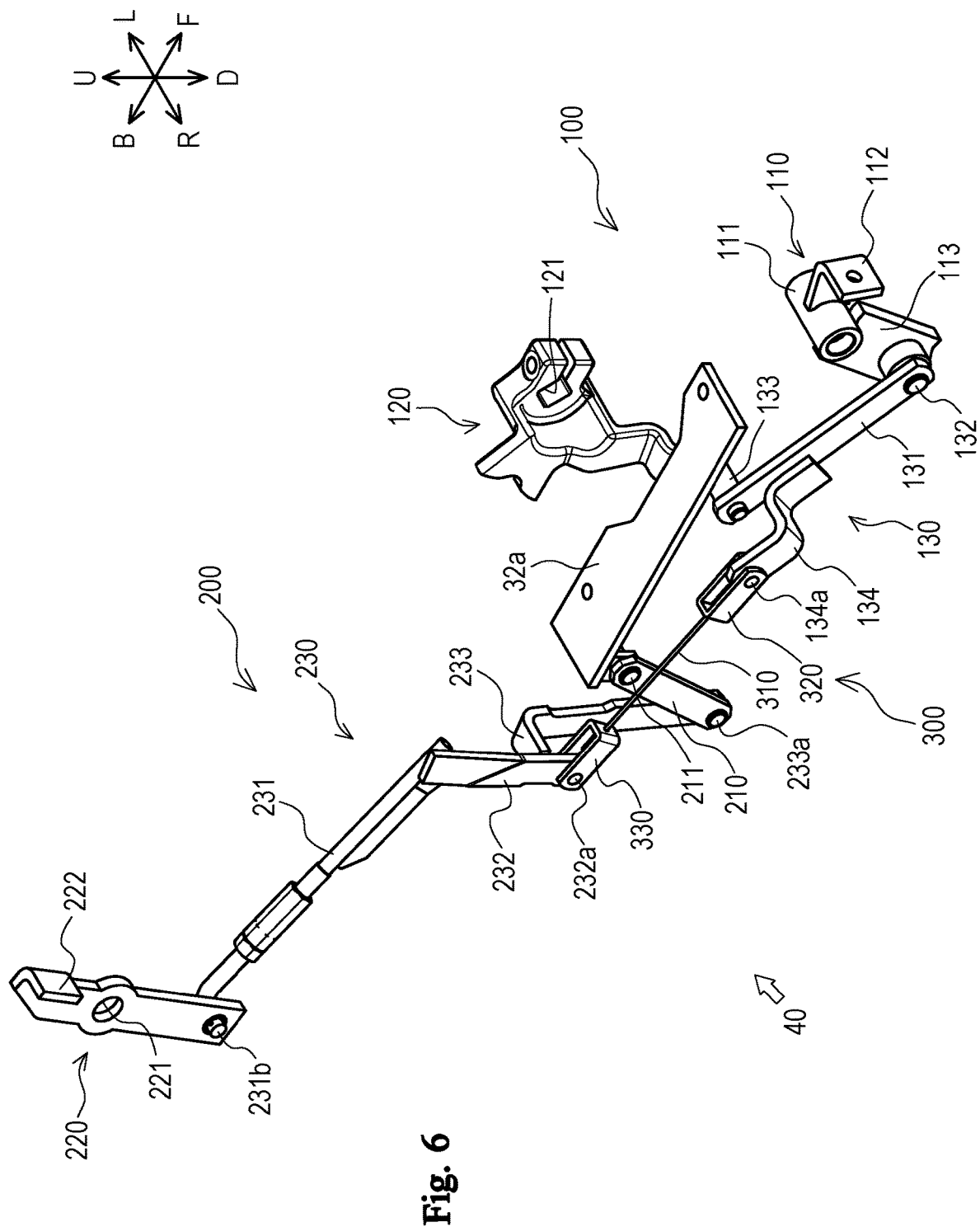
FIG. 6 is a perspective view of the same.
Figure 7:
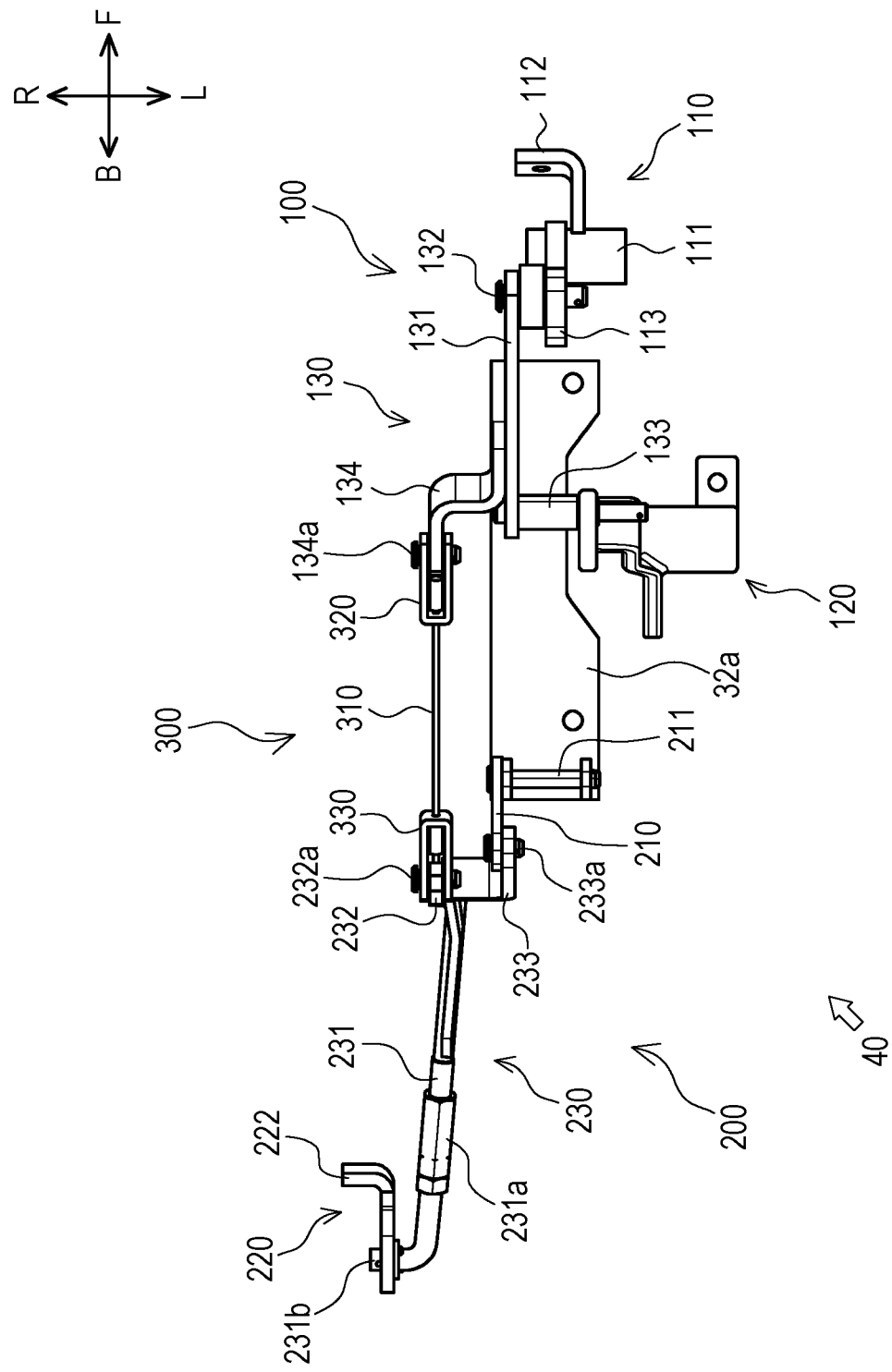
FIG. 7 is a bottom view of the same.

The operation mechanism 40 illustrated in FIGS. 5 to 7 mainly includes a first link portion 100, a second link portion 200, and a third link portion 300.

The first link portion 100 is a portion of the operation mechanism 40 that is supported by the vehicle body. The first link portion 100 mainly includes a pedal-side lever 110, an HST-side lever 120, and an interlocking member 130.

The pedal-side lever 110 is a member that is interlocked with the speed change pedal 22 (see FIG. 4). The pedal-side lever 110 mainly includes a rotation support portion 111, a front connection portion 112, and a lower connection portion 113.

The rotation support portion 111 is a portion that is rotatably supported by the vehicle body. The rotation support portion 111 is formed in a substantially cylindrical shape with the longitudinal direction directed in the right-left direction. The rotation support portion 111 is rotatably supported below the cabin 20 (bottom frame 32) by a rotation shaft 2d fixed to the right side surface of the center frame 2C. The rotation shaft 2d is disposed with the axial direction directed in the right-left direction. The rotation support portion 111 can rotate around the rotation shaft 2*d* clockwise or counterclockwise as viewed from the side.

The front connection portion 112 is a portion connected to the speed change pedal 22. The front connection portion 112 is formed by appropriately bending a substantially rectangular panel member. The front connection portion 112 is fixed to the outer peripheral surface of the rotation support portion 111. The front connection portion 112 is disposed so as to project substantially forward from the rotation support portion 111. The speed change pedal 22 is connected to the front end portion of the front connection portion 112 via a rod 22*a*.

The lower connection portion 113 is a portion connected to the interlocking member 130 described later. The lower connection portion 113 is formed of a substantially rectangular panel member. The lower connection portion 113 is fixed to the outer peripheral surface of the rotation support portion 111. The lower connection portion 113 is disposed so as to project substantially downward from the rotation support portion 111.

The HST-side lever 120 is a member that is interlocked with the transmission 5 (HST in this embodiment). The HST-side lever 120 is formed in an appropriate shape. A fitting portion 121 to be fitted with a transmission shaft 5*a* (the trunnion shaft of the HST) of the transmission 5 is formed at the upper portion of the HST-side lever 120. The transmission shaft 5*a* is disposed above and behind the rotation shaft 2*d* of the center frame 2C with the axial direction directed in the right-left direction. The HST-side lever 120 can rotate integrally with the transmission shaft 5*a* clockwise or counterclockwise as viewed from the side. The lower portion of the HST-side lever 120 is formed to extend downward and outward.

The interlocking member 130 is a member that interlocks the HST-side lever 120 with other members (the pedal-side lever 110 and the third link portion 300 described later). The interlocking member 130 mainly includes a main body 131, a pedal-side connection shaft 132, an HST-side connection shaft 133, and a branch portion 134.

The main body 131 is a member that connects the pedal-side lever 110 and the HST-side lever 120. The main body 131 is formed of a substantially rectangular panel member. The main body 131 is disposed with the longitudinal direction directed in substantially the front-rear direction. The main body 131 is disposed on the right side of the pedal-side lever 110 and the HST-side lever 120.

The pedal-side connection shaft 132 connects the main body 131 and the pedal-side lever 110. The pedal-side connection shaft 132 is disposed with the axial direction directed in the right-left direction. The pedal-side connection shaft 132 is rotatably inserted into the front end portion of the main body 131 and the lower end portion of the lower connection portion 113 of the pedal-side lever 110.

The HST-side connection shaft 133 connects the main body 131 and the HST-side lever 120. The HST-side connection shaft 133 is disposed with the axial direction directed in the right-left direction. The HST-side connection shaft 133 is rotatably inserted into the rear end portion of the main body 131 and the lower end portion of the HST-side lever 120.

The branch portion 134 is a member disposed to branch from the main body 131. The branch portion 134 is formed by appropriately bending a substantially rectangular panel member. Specifically, the branch portion 134 is bent in a substantially S-shape in plan view such that the rear end portion is positioned outside the front end portion. The branch portion 134 is disposed on the right side of the main body 131 with the longitudinal direction directed substantially in the front-rear direction (substantially parallel to the main body 131). The front end portion of the branch portion 134 is fixed to the front-rear middle portion of the main body 131 by an appropriate method (such as welding). A connection shaft 134*a* is provided at the rear end portion of the branch portion 134.

The connection shaft 134*a* connects the branch portion 134 and the third link portion 300 described later. The connection shaft 134*a* is formed in a substantially columnar shape with the axial direction directed in the right-left direction. The connection shaft 134*a* is inserted into the rear end portion of the branch portion 134.

As described above, the first link portion 100 is supported by the vehicle body. Specifically, the pedal-side lever 110 is supported by the center frame 2C, and the HST-side lever 120 is supported by the transmission 5.

The operation of the speed change pedal 22 can be transmitted to the transmission 5 by the first link portion 100 configured as described above, so as to change the shift stage of the transmission 5. Specifically, when the front portion of the speed change pedal 22 is depressed, the pedal-side lever 110 rotates via the rod 22*a* clockwise as viewed from the right side. The rotation of the pedal-side lever 110 is transmitted to the HST-side lever 120 through the interlocking member 130, and the HST-side lever 120 rotates clockwise as viewed from the right side. Thus, the transmission shaft 5*a* of the transmission 5 can be rotated clockwise as viewed from the right side, and the shift stage of the transmission 5 can be changed steplessly to the forward side.

When the rear portion of the speed change pedal 22 is depressed, the pedal-side lever 110 rotates via the rod 22*a* counterclockwise as viewed from the right side. The rotation of the pedal-side lever 110 is transmitted to the HST-side lever 120 through the interlocking member 130, and the HST-side lever 120 rotates counterclockwise as viewed from the right side. Thus, the transmission shaft 5*a* of the transmission 5 can be rotated counterclockwise as viewed from the right side, and the shift stage of the transmission 5 can be changed steplessly to the reverse side.

The second link portion 200 is a portion of the operation mechanism 40 that is supported by the cabin 20. The second link portion 200 mainly includes a first rotation member 210, a second rotation member 220, and a connection member 230.

The first rotation member 210 is a member that is rotatably supported on the bottom surface of the cabin 20. The first rotation member 210 is formed of a substantially rectangular panel member. The first rotation member 210 is disposed behind the first link portion 100 with the longitudinal direction of the first rotation member 210 directed substantially in a vertical direction. The upper end portion of the first rotation member 210 is rotatably supported by a stay 32*a* provided on the bottom surface (the lower surface of the bottom frame 32) of the cabin 20. Specifically, the upper end portion of the first rotation member 210 is rotatably supported by the stay 32*a* via a connection shaft 211 disposed with the axial direction directed in the right-left direction. The first rotation member 210 can rotate around the connection shaft 211 clockwise or counterclockwise as viewed from the side.

The second rotation member 220 is a member that is rotatably supported by the side frame 30 of the cabin 20. The second rotation member 220 is formed of a substantially rectangular panel member. The second rotation member 220 is disposed above and behind the first rotation member 210 with the longitudinal direction directed substantially in the vertical direction. The second rotation member 220 is formed with a through hole 221 and a protrusion 222.

The through hole 221 is a hole that penetrates the second rotation member 220 from side to side. The through hole 221 is formed in the vertical middle portion of the second rotation member 220.

The protrusion 222 is a portion formed to protrude rightward from the second rotation member 220. The protrusion 222 is formed by bending the front upper end portion of the second rotation member 220 rightward.

The second rotation member 220 is rotatably supported with respect to the side frame 30 of the cabin 20. Specifically, the connection shaft 30a which is disposed such that the axial direction is directed in the right-left direction is inserted into the through hole 221 of the second rotation member 220. The connection shaft 30a is formed to protrude leftward from the inside (left side surface) of the side frame 30. The second rotation member 220 can rotate around the connection shaft 30a clockwise or counterclockwise as viewed from the side.

The cruise lever 27 described above is also rotatably supported by the connection shaft 30a. The cruise lever 27 is disposed between the side frame 30 and the second rotation member 220 in the right-left direction. When the cruise lever 27 is rotated forward (clockwise as viewed from the right side), the cruise lever 27 comes into contact with the protrusion 222 of the second rotation member 220 from behind. Accordingly, the second rotation member 220 also rotates forward together with the cruise lever 27.

The connection member 230 is a member that connects the first rotation member 210 and the second rotation member 220. The connection member 230 mainly includes an adjusting portion 231, a first plate-shaped portion 232, and a second plate-shaped portion 233.

The adjusting portion 231 is a portion of which the length can be adjusted. The adjusting portion 231 is formed in a rod shape. The adjusting portion 231 is disposed with the longitudinal direction directed substantially in the front-rear direction. A turnbuckle-shaped adjusting metal member 231a having a pair of female screws (reverse screw) is provided in the middle portion of the adjusting portion 231. When the adjusting metal member 231a is rotated in an arbitrary direction, the overall length (length in the longitudinal direction) of the adjusting portion 231 can be arbitrarily changed. In addition, a connection portion 231b is formed in the adjusting portion 231.

The connection portion 231b is a portion connected to the second rotation member 220. The connection portion 231b is formed by bending one end (rear end) of the adjusting portion 231 toward the right side. Accordingly, the connection portion 231b is formed in an axial shape (columnar shape) with the axial direction directed in the right-left direction. The connection portion 231b is connected to the second rotation member 220 so as to be rotatable by being inserted into the lower end portion of the second rotation member 220.

The first plate-shaped portion 232 is a portion connected to the third link portion 300 described later. The first plate-shaped portion 232 is formed of a substantially rectangular panel member. The first plate-shaped portion 232 is disposed on the right side of the adjusting portion 231 with the longitudinal direction directed substantially in the vertical direction. The upper end portion of the first plate-shaped portion 232 is fixed to the front end portion of the adjusting portion 231 by an appropriate method (such as welding). A connection shaft 232a is provided at the lower end portion of the first plate-shaped portion 232.

The connection shaft 232a connects the first plate-shaped portion 232 and the third link portion 300 described later. The connection shaft 232a is formed in a substantially columnar shape with the axial direction directed in the right-left direction. The connection shaft 232a is inserted into the lower end portion of the first plate-shaped portion 232.

The second plate-shaped portion 233 is a portion connected to the first rotation member 210. The second plate-shaped portion 233 is formed by appropriately bending a substantially rectangular panel member. Specifically, the second plate-shaped portion 233 is disposed with the longitudinal direction directed substantially in the vertical direction and is formed by bending the upper end portion to the right side. The second plate-shaped portion 233 is disposed on the left side of the first plate-shaped portion 232. The upper end portion of the second plate-shaped portion 233 is fixed to the vertical middle portion of the first plate-shaped portion 232 by an appropriate method (such as welding). The lower end portion of the second plate-shaped portion 233 extends below the lower end portion of the first plate-shaped portion 232. The lower end portion of the second plate-shaped portion 233 is disposed so as to be displaced leftward with respect to the first plate-shaped portion 232. A connection shaft 233a is provided at the lower end portion of the second plate-shaped portion 233.

The connection shaft 233a connects the second plate-shaped portion 233 and the first rotation member 210. The connection shaft 233a is formed in a substantially columnar shape with the axial direction directed in the right-left direction. The connection shaft 233a is disposed at a position lower than the connection shaft 232a of the first plate-shaped portion 232. The connection shaft 233a is inserted into the lower end portion of the second plate-shaped portion 233 and the lower end portion of the first rotation member 210. Accordingly, the second plate-shaped portion 233 and the first rotation member 210 are rotatably connected.

As described above, the second link portion 200 is supported by the cabin 20. Specifically, the first rotation member 210 is supported by the stay 32a of the cabin 20, and the second rotation member 220 is supported by the side frame 30. That is, the second link portion 200 is supported only by the cabin 20 placed on the vehicle body, and is not directly supported by the vehicle body.

The third link portion 300 connects the first link portion 100 and the second link portion 200 so as to be interlockable. The third link portion 300 mainly includes a wire 310, a front wire stay 320, and a rear wire stay 330.

The wire 310 is a flexible member. The wire 310 is formed in a long shape (elongated line shape). The wire 310 can be deformed (deflected) elastically when a force is applied in the compression direction.

The front wire stay 320 is a member that connects the wire 310 and the first link portion 100. The front wire stay 320 is formed by bending a panel member into a substantially U-shape in plan view. One end (front end) of the wire 310 is fixed to the front wire stay 320. The front wire stay 320 is disposed so as to sandwich the rear end portion of the branch portion 134 of the first link portion 100. In this state, when the connection shaft 134a is inserted into the front wire stay 320, the front wire stay 320 is rotatably connected to the branch portion 134.

The rear wire stay 330 is a member that connects the wire 310 and the second link portion 200. The rear wire stay 330 is formed by bending a panel member into a substantially U-shape in plan view. The other end (rear end) of the wire 310 is fixed to the rear wire stay 330. The rear wire stay 330 is disposed so as to sandwich the lower end portion of the first plate-shaped portion 232 of the second link portion 200. In this state, when the connection shaft 232a is inserted into the rear wire stay 330, the rear wire stay 330 is rotatably connected to the first plate-shaped portion 232.

The operation of the cruise lever 27 can be transmitted to the transmission 5 by the second link portion 200 and the third link portion 300 configured as described above, so as to change the shift stage of the transmission 5. Specifically, when the cruise lever 27 is rotated forward, the second rotation member 220 also rotates forward (clockwise as viewed from the right side) by being pushed by the cruise lever 27. When the second rotation member 220 rotates, the connection member 230 moves rearward. Thus, the third link portion 300 connected to the connection member 230 is pulled rearward. When the third link portion 300 is pulled rearward, the interlocking member 130 of the first link portion 100 to which the third link portion 300 is connected is also pulled rearward. Due to the force applied to the interlocking member 130, the HST-side lever 120 rotates clockwise as viewed from the right side. Thus, the transmission shaft 5a of the transmission 5 can be rotated clockwise as viewed from the right side, and the shift stage of the transmission 5 can be changed steplessly to the forward side. Further, as described above, the cruise lever 27 can be held at an arbitrary operation position, so that the shift stage of the transmission 5 can be kept constant.

As described above, in this embodiment, the first link portion 100 (the mechanism of the speed change pedal 22) and the second link portion 200 (the mechanism on the cruise lever 27 side) are connected via the third link portion 300. Here, the first link portion 100 is supported by the center frame 2C of the vehicle body and the transmission 5. For this reason, the vibration (the vibration or the like caused by driving the engine 3 or the transmission 5) of the vehicle body is easily transmitted to the first link portion 100. On the other hand, since the second link portion 200 is supported by the cabin 20, the vibration of the vehicle body is not easily transmitted. Particularly, in this embodiment, the second link portion 200 is connected to the first link portion 100 via the flexible third link portion 300 (wire 310). Therefore, the transmission of the vibration of the first link portion 100 to the second link portion 200 can be suppressed while the transmission 5 can be operated through the second link portion 200.

As described above, the noise in the cabin 20 can be reduced by suppressing the transmission of the vibration from the vehicle body to the second link portion 200. That is, it is possible to suppress the noise generated when the vibration is transmitted to interior components (the cover of the console 24, the fender 31, and the like) in the cabin 20 through the second link portion 200.

As described above, the operation mechanism 40 of the tractor 1 (work vehicle) according to this embodiment includes: the first link portion 100 which is supported by the vehicle body (the center frame 2C, the transmission 5, and the like); the second link portion 200 which is supported by the cabin 20 placed on the vehicle body; and the third link portion 300 which has flexibility and connects the first link portion 100 and the second link portion 200 so as to be interlockable.

With this configuration, the transmission of the vibration from the vehicle body to the cabin 20 can be suppressed. Accordingly, the noise in the cabin 20 can be reduced.

Further, the first link portion 100 is connected to the transmission 5 such that the shift stage of the transmission 5 is changeable.

With this configuration, the transmission of the vibration from the transmission 5 can be suppressed.

Further, the second link portion 200 is connected to the cruise lever 27 (operation tool) capable of changing the shift stage of the transmission 5.

With this configuration, the transmission of the vibration from the transmission 5 to the operation tool can be suppressed. Accordingly, the noise in the cabin 20 through the operation tool can be reduced.

Further, the operation tool is provided in the console 24 disposed on right and left sides of the seat 23.

With this configuration, the transmission of the vibration from the operation tool to the console 24 can be suppressed. Accordingly, the noise in the cabin 20 through the console 24 can be reduced.

Further, the operation tool is the cruise lever 27 capable of keeping the shift stage of the transmission 5 constant.

With such a configuration, the noise in the cabin 20 through the cruise lever 27 can be reduced.

Further, the second link portion 200 includes the first rotation member 210 which is rotatably supported with respect to a bottom surface of the cabin 20, the second rotation member 220 which is disposed to be at least partially positioned inside the cabin 20 and is rotatably supported by the cabin 20, and the connection member 230 which connects the first rotation member 210 and the second rotation member 220.

With such a configuration, two members of the first rotation member 210 and the second rotation member 220 are supported by the cabin 20, so that the second link portion 200 can be stably supported.

Further, the connection member 230 includes the connection shaft 233a (first connection portion) which is connected to the first rotation member 210, the connection portion 231b (second connection portion) which is connected to the second rotation member 220, and the connection shaft 232a (third connection portion) which is disposed between the connection shaft 233a and the connection portion 231b in a vertical direction and to which the third link portion 300 is connected.

With such a configuration, a gap between the connection shaft 232a and the connection portion 231b can be reduced, and the stress applied to the connection member 230 can be reduced. That is, when the cruise lever 27 is operated, the force of the rotation of the second rotation member 220 is transmitted to the third link portion 300 through the connection portion 231b and the connection shaft 232a. At this time, by making the gap between the connection portion 231b and the connection shaft 232a relatively small, it is possible to reduce the stress applied to the member (that is, the connection member 230) disposed between the connection portion 231b and the connection shaft 232a.

Further, the connection shaft 232a is disposed so as to be displaced with respect to the connection shaft 233a in the right-left direction.

With such a configuration, the load applied to the connection member 230 can be dispersed. That is, in this embodiment, by dispersing the load applied to the connection member 230 to the first plate-shaped portion 232 and the second plate-shaped portion 233, deformation and the like of the connection member 230 can be suppressed. Further, another member can be disposed between the connection shaft 232a and the connection shaft 233a displaced to the right and left, so as to increase the degree of freedom in design.

Further, the tractor 1 includes the operation mechanism 40.

With this configuration, the transmission of the vibration from the vehicle body to the cabin 20 can be suppressed. Accordingly, the noise in the cabin 20 can be reduced.

The tractor 1 according to this embodiment is one embodiment of the work vehicle according to the disclosure.

The cruise lever 27 according to this embodiment is one embodiment of the operation tool according to the disclosure.

The connection shaft 233a according to this embodiment is one embodiment of the first connection portion according to the disclosure.

The connection portion 231b according to this embodiment is one embodiment of the second connection portion according to the disclosure.

The connection shaft 232a according to this embodiment is one embodiment of the third connection portion according to the disclosure.

Although the embodiment according to the disclosure has been described above, the disclosure is not limited to the above configuration, and various modifications can be made within the scope of the disclosure described in the claims.

For example, the work vehicle according to this embodiment is the tractor 1, but the type of the work vehicle according to the disclosure is not limited to this. The work vehicle according to the disclosure may be another agricultural vehicle, a construction vehicle, an industrial vehicle, or the like.

Further, in this embodiment, the operation mechanism 40 that changes the shift stage of the transmission 5 based on the operation of the speed change pedal 22 and the cruise lever 27 has been described as an example. However, the disclosure is not limited to this and may be applied to other various operation mechanisms 40. For example, the disclosure may be applied to a device for operating the front loader based on an operation by the loader lever 25, a device for operating the lifting device 9 based on an operation by the position lever 26, and the like.

Further, in this embodiment, the transmission 5 having the HST is described. However, the disclosure is not limited to this and may be applied to various other transmissions.

Further, in this embodiment, the cruise lever 27 provided in the console 24 has been exemplified as an operation tool, but the place where the operation tool is disposed is not limited to this. For example, the operation tool may be disposed in a steering post or the like provided with the steering wheel 21.

Further, the specific configuration of the operation mechanism 40 exemplified in this embodiment is an example. The specific shape and arrangement of each member are not limited as long as a portion (the first link portion 100 in this embodiment) supported by the vehicle body and a portion (the second link portion 200 in the embodiment) supported by the cabin 20 are connected by a flexible member (the third link portion 300 in this embodiment). For example, a push-pull type wire (a wire that can be pushed and pulled) can be used instead of the wire 310 according to this embodiment. Further, it is also possible to adopt a configuration in which the second link portion 200 does not include the first rotation member 210 and the connection member 230, and the rear wire stay 330 of the wire 310 is connected to the second rotation member 220.

What is claimed is:

1. An operation mechanism of a work vehicle comprising:
   a first link portion which is supported by the vehicle body, wherein the first link portion is connected to a transmission such that a shift stage of the transmission is changeable;
   a second link portion which is supported by a cabin placed on the vehicle body, wherein the second link portion is connected to an operation tool capable of changing the shift stage of the transmission; and
   a third link portion which has flexibility and connects the first link portion and the second link portion so as to be interlockable, wherein the third link portion includes a wire that is configured to be deformed when a force is applied in a compressive direction, and is configured to suppress a vibration transmitted from the first link portion to the second link portion.

2. The operation mechanism of a work vehicle according to claim 1, wherein
   the second link portion includes:
   a first rotation member which is rotatably supported with respect to a bottom surface of the cabin;
   a second rotation member which is disposed to be at least partially positioned inside the cabin and is rotatably supported by the cabin; and
   a connection member which connects the first rotation member and the second rotation member.

3. The operation mechanism of a work vehicle according to claim 2, wherein
   the connection member includes:
   a first connection portion which is connected to the first rotation member;
   a second connection portion which is connected to the second rotation member; and
   a third connection portion, which is disposed at a position higher than the first connection portion and lower than the second connection portion, and to which the third link portion is connected.

4. The operation mechanism of a work vehicle according to claim 3, wherein
   the third connection portion is disposed to be displaced with respect to the first connection portion in a right-left direction.

5. The operation mechanism of a work vehicle according to claim 1, wherein
   the operation tool is provided in a console disposed on right and left sides of a seat.

6. The operation mechanism of a work vehicle according to claim 5, wherein
   the operation tool is a cruise lever capable of keeping the shift stage of the transmission constant.

7. The operation mechanism of a work vehicle according to claim 6, wherein
   the second link portion includes:
   a first rotation member which is rotatably supported with respect to a bottom surface of the cabin;
   a second rotation member which is disposed to be at least partially positioned inside the cabin and is rotatably supported by the cabin; and
   a connection member which connects the first rotation member and the second rotation member.

8. The operation mechanism of a work vehicle according to claim 7, wherein
   the connection member includes:
   a first connection portion which is connected to the first rotation member;
   a second connection portion which is connected to the second rotation member; and a third connection portion, which is disposed at a position higher than the first connection portion and lower than the second connection portion, and to which the third link portion is connected.

9. The operation mechanism of a work vehicle according to claim 5, wherein
the second link portion includes:
a first rotation member which is rotatably supported with respect to a bottom surface of the cabin;
a second rotation member which is disposed to be at least partially positioned inside the cabin and is rotatably supported by the cabin; and
a connection member which connects the first rotation member and the second rotation member.

10. The operation mechanism of a work vehicle according to claim 9, wherein
the connection member includes:
a first connection portion which is connected to the first rotation member;
a second connection portion which is connected to the second rotation member; and
a third connection portion, which is disposed at a position higher than the first connection portion and lower than the second connection portion, and to which the third link portion is connected.

11. The operation mechanism of a work vehicle according to claim 1, wherein
the operation tool is a cruise lever capable of keeping the shift stage of the transmission constant.

12. The operation mechanism of a work vehicle according to claim 11, wherein
the second link portion includes:
a first rotation member which is rotatably supported with respect to a bottom surface of the cabin;
a second rotation member which is disposed to be at least partially positioned inside the cabin and is rotatably supported by the cabin; and
a connection member which connects the first rotation member and the second rotation member.

13. The operation mechanism of a work vehicle according to claim 12, wherein
the connection member includes:
a first connection portion which is connected to the first rotation member;
a second connection portion which is connected to the second rotation member; and
a third connection portion, which is disposed at a position higher than the first connection portion and lower than the second connection portion, and to which the third link portion is connected.

14. A work vehicle comprising:
the operation mechanism according to claim 1.

* * * * *